United States Patent [19]

Purvis

[11] 4,230,833

[45] Oct. 28, 1980

[54] SINGLE STAGE CONTINUOUS GRAFT POLYMERIZATION PROCESS AND PRODUCT

[75] Inventor: Marshall T. Purvis, Newtown, Pa.

[73] Assignee: Rohm and Haas Company, Philadelphia, Pa.

[21] Appl. No.: 10,356

[22] Filed: Feb. 8, 1979

[51] Int. Cl.$^2$ .................... C08F 279/02; C08F 279/06
[52] U.S. Cl. .................................... 525/260; 525/263; 525/264; 525/265; 525/310
[58] Field of Search ........................... 260/880 R, 879; 525/260, 263, 264, 265, 310

[56] References Cited

U.S. PATENT DOCUMENTS

| | | | |
|---|---|---|---|
| 3,267,178 | 8/1966 | Lee | 260/880 R |
| 3,359,345 | 12/1967 | Doak | 260/880 R |
| 3,400,175 | 9/1968 | Finestone et al. | 260/880 R |
| 3,900,453 | 8/1975 | Shimada et al. | 260/880 R |
| 4,100,228 | 7/1978 | Dennis et al. | 260/880 R |
| 4,101,702 | 7/1978 | Churchill et al. | 260/880 R |

Primary Examiner—William F. Hamrock
Attorney, Agent, or Firm—Michael B. Fein

[57] ABSTRACT

A continuous, single stage process for grafting methyl methacrylate polymer or copolymer onto a synthetic rubber, and the resultant graft polymers which have a dispersed rubber phase in a continuous hard phase are disclosed.

15 Claims, No Drawings

SINGLE STAGE CONTINUOUS GRAFT POLYMERIZATION PROCESS AND PRODUCT

BACKGROUND OF THE INVENTION

1. Field of the Invention

This invention relates to graft polymerization of synthetic rubber and methyl methacrylate polymers and copolymers.

2. Description of the Prior Art

In the rubber modified impact polystyrene art, it is well known to use alkyl methacrylate as comonomers with styrene, which are polymerized in the presence of synthetic rubbers such as butadiene-styrene copolymers. Roche et al, U.S. Pat. No. 2,941,977, disclose a homogeneous and inseparable dispersion of the copolymer ingredients with one another. Lee U.S. Pat. No. 3,267,178 discloses graft polymers prepared by dissolving or dispersing rubbery butadiene polymer in monomers, heating first in mass while agitating to partially polymerize the monomers, then suspending the partially polymerized liquid in an inert aqueous medium at elevated temperatures to polymerize the remaining monomers.

Lunk et al, U.S. Pat. No. 3,178,489, disclose a bulk or mass polymerization of styrene-methyl methacrylate copolymer in certain ratios in the presence of dissolved styrene/butadiene copolymer in two or three successive stages. British Pat. No. 1,489,263 shows polymerization of styrene by mass polymerization in the presence of dissolved synthetic rubber in three successive zones in a devolatilizing extruder to produce high impact polystyrene. Kelsey, U.S. Pat. No. 4,080,406 shows polymerization of vinyl aromatic monomer and methyl or ethyl methacrylate in the presence of a synthetic rubber by different processes, one of which is a continuous or partially continuous process wherein solution is continuously introduced and removed from a stirred reactor at a constant 30–50% solids content; then completion of the polymerization at higher temperatures for several hours in a second stage. Shimada et al, U.S. Pat. No. 3,900,453 teach polymerization of methacrylates continuously in a stirred reactor at temperatures above 130° C. and below 160° C. The monomer feed contains mercaptan as well as free radical initiator. Among the modifier materials are polymers such as polystyrene and synthetic rubbers "incorporated in the polymerization or volatile removing steps, or after the volatile removing step. In most cases," Shimada et al say, "it is preferred to incorporate these additives after the polymerization step".

None of the prior art processes in this field produce products which have excellent clarity, impact strength, rigidity, and melt flow properties.

SUMMARY OF THE INVENTION

It is therefore an object of this invention to provide an improved, more efficient process for producing graft polymers of methyl methacrylate homopolymer or copolymer onto synthetic rubber. It is a further object to provide improved graft polymers of methyl methacrylate homo- or copolymers, as the continuous phase, and synthetic rubber polymer as the dispersed phase. It is a still further object to provide such graft polymers having a highly desirable combination of impact strength, clarity, rigidity, and melt flow properties which were not heretofore achievable with prior art processes.

These objects and others as will become apparent from the following disclosure are achieved by the present invention which comprises in one aspect a single stage process comprising continuously introducing a solution of synthetic rubber in a monomer system comprising methyl methacrylate into a single reactor, continuously stirring the reactor contents, controlling the temperature at about 161° to 195° C., controlling the pressure at 100 to 175 psig., controlling the average residence time to below 90 minutes, and continuously removing the resultant graft polymer having a dispersed rubber phase and a continuous hard phase from said reactor. In another aspect, the invention comprises the graft polymer compositions prepared by this process.

DETAILED DESCRIPTION OF THE INVENTION AND THE PREFERRED EMBODIMENTS

The monomer system is comprised of methyl methacrylate preferably about 60 to 100%. Styrene is optionally present, preferably in amounts of about one to 40%. The presence of styrene is preferred because of its solvating properties. The preferred monomer systems consist of about 1 to 40% styrene and the balance methyl methacrylate. Other additional comonomers, present in amounts of 0 to 10% each, are acrylonitrile, alpha-methyl styrene, ethyl acrylate, butyl acrylate, methyl acrylate, and the like. If transparency is desired in the final product, comonomers are chosen so as to produce a refractive index of the methyl methacrylate copolymer to match that of the synthetic rubber.

The synthetic rubber can be polybutadiene, butadiene-styrene copolymers, butadiene-acrylonitrile copolymers, ethylene-propylene diene copolymers, isoprene polymers and copolymers, and the like. The synthetic rubber should have residual unsaturation or other sites which can be employed for free radically grafting. The preferred synthetic rubbers are polybutadiene and butadiene-styrene copolymers containing 50% or less styrene.

The synthetic rubber is preferably predissolved in the monomer system which acts as a reactive solvent. It is optional to have an inert solvent such as xylene, toluene, or benzene. Such inert solvents also act as polymerization controlling agents and mild chain transfer agents during polymerization. Up to 25% of the feed can be one or more of said inert solvents, but preferably the upper limit of such solvents is about 20%.

About 30 to 300 ppm based on reactive monomer of organic peroxide or azo initiator is added to the solution. Preferably about $1.0 \times 10^{-4}$ to $10^{-5}$ moles of initiator per mole of monomer is employed. Suitable initiators are benzoyl peroxide, methyl ethyl ketone peroxide, dicumyl peroxide, 2,5-dimethyl-2,5-di(t-butyl peroxy)hexane, di-t-butyl peroxide, 2,5-dimethyl-2,5-di-(t-butyl peroxy)hexane-3, t-butyl hydroperoxide, 3,6,6,9,9-pentamethyl-3-n-butyl-1,2,4,5 tetraoxy cyclononane, di-t-butyl perbenzoate, t-butyl peroxyisopropylcarbonate, and azobisisobutanol diacetate. The solution can optionally also contain mercaptan as a chain transfer agent.

The resultant solution is continuously introduced in a continuously stirred single reactor at a temperature controlled to about 161° to 195° C. and pressure controlled to about 100 to 175 psig. The product is continuously removed at a rate so as to control the average residence time to below 90 minutes. The residence time should be at least one minute. If the average residence time substantially exceeds 90 minutes, the impact strength of the resultant products is significantly diminished. The use of lower residence times is also economically advantageous. As mentioned, the reactor is continuously stirred to create a turbulent flow, preferably at a rate of about 1,000 to 2,000 rpm, to create a turbulent mass flow with Reynold's values to exceed 2,100. The preferred temperature for the reaction is about 165° to 180° C.

When the reaction is conducted in the absence of an inert solvent, the continuously removed product is polymerized to a monomer conversion which is preferably about 30 to 60%, whereas in the case where the polymerization is conducted in presence of an inert solvent, the continuously removed product is polymerized to about 40 to 90% monomer conversion.

After devolatilizing the product to remove inert solvent and/or unreacted monomer, a graft polymer product with a previously unattained conbination of properties is obtained. Without intending to be limited by this theory, it is believed that the uniqueness of the product is obtained by the controlled degree of grafting of the rubber and hard phases, and vulcanization of the rubber phase through efficient mixing and uniform temperature during the entire polymerization in a single stage. It appears that the morphology of the polymer is controlled to give a glassy continuum containing a narrow distribution of small rubber particles which in turn favorably influences surface gloss and clarity, impact resistance, rigidity, and low melt viscosity. To achieve this control and to achieve such excellent properties, it is preferred that the synthetic rubber be introduced as a solution.

Lubricants, thermal and UV stabilizers, colorants, and similar additives can be added either to the solution or during the process.

Without intending to be limited thereto, the following examples are presented to illustrate a few embodiments of the invention. All parts and percentages throughout this disclosure are by weight unless otherwise indicated.

EXAMPLES

In the following experiments, polymerization of the reaction mixture was conducted under continuous conditions in a single stage reaction process with temperature preferably at 161°–195° C., with residence time below 90 min., and achievement of 25–65% monomer conversion to polymer. The reactor vessel had a 1.7 gal. volume capacity and was fitted with a multi-bladed turbine agitator, operated preferably at 1000–2000 rpm to achieve turbent mass flow with Reynold's values to exceed 2100. The reaction was operated at 100–175 psig.

"Steady state" polymerization conditions were achieved within five full reactor volumes from start-up. Start-up was accomplished by filling the 1.7 gal. stainless steel reaction vessel with the reaction mixture, pressurizing the reactor and contents to 100–175 psig, commencing agitation, increasing temperature to target conditions with the aid of external electrical heaters, and then continually delivering reaction mixture to the vessel at a finite rate while continually removing the partially polymerized reaction mixture from the vessel at an identical rate. Temperature of the reactor contents was monitored from thermocouples positioned at the top, middle, and bottom of the vessel.

Removal of residual volatiles, inert solvent or unreacted monomer, was accomplished above 150° C. by devolatilization. Total residual volatiles in the final polymer should not exceed 1.0%.

Physical properties of these materials were determined on molded specimens under the following procedures:

| Property | ASTM Procedure |
|---|---|
| Izod Notched Impact Strength (0.125" thickness specimens) | D-256 |
| Flexural Strength | D-790 |
| Haze (determined on 0.125" thickness specimens) | D-1003 |
| Deflection Temperature Under Load (DTUL) | D-648 |
| Melt Flow Rate (F or I) | D-1238 |

EXAMPLE 1

A solution comprising 7.3 lbs. polybutadiene rubber, 67.5 lbs. methyl methacrylate monomer, 18.0 lbs. styrene monomer, 4.5 lbs. acrylonitrile monomer, 10.0 lbs. toluene, and 4.90 gms peroxide initiator was continuously polymerized at 165° C., 30 min. residence time, 175 psig. Monomer conversion to polymer rate of 32.0% was observed. Devolatilized material exhibited the following performance:

Izod Notched Impact, 23° C.=3.9 ft-lbs/in. notch.

EXAMPLE 2

A solution comprising 7.705 lbs. polybutadiene rubber, 68.670 lbs. methyl methacrylate monomer, 17.170 lbs. styrene monomer, 21.460 lbs. xylene, and 5.84 gms peroxide initiator was continuously polymerized at 175° C., 30 min. residence time, 175 psig. Monomer conversion to polymer rate of 35.9% was observed. Devolatilized material exhibited the following performance:

Izod Notched Impact, 23° C.=4.1 ft-lbs/in. notch.
Flexural Modulus of Elasticity, 23° C.=268,770 psi.

EXAMPLE 3

A solution comprising 8.522 lbs. poly(butadiene/styrene) (80/20) rubber, 55.369 lbs. methyl methacrylate monomer, 29.814 lbs. styrene monomer, 21.296 lbs. xylene, and 5.80 gms peroxide initiator was continuously polymerized at 175° C., 30 min. residence time, 175 psig. Monomer conversion to polymer rate of 37.3% was observed. Devolatilized material exhibited the following performance:

Izod Notched Impact, 23° C.=5.2 ft-lbs/in. notch. 0° C.=2.5 ft-lbs/in. notch. −40° C.=1.5 ft-lbs/in. notch.
Flexural Modulus of Elasticity, 23° C.=268,640 psi.
DTUL, 264 psi=79° C.

EXAMPLE 4

A solution comprising 7.705 lbs. polybutadiene rubber, 68.670 lbs. methyl methacrylate monomer, 17.170 lbs. styrene monomer, 21.460 lbs. xylene, and 5.96 gms di-t-butyl peroxide initiator was continuously polymerized at 175° C., 30 min. residence time, 175 psig. Monomer conversion to polymer rate of 35.1% was observed. Devolatilized material exhibited the following performance:

Izod Notched Impact, 23° C.=4.1 ft-lbs/in. notch. −40° C.=2.0 ft-lbs/in. notch.

Flexural Modulus of Elasticity, 23° C.=272,430 psi.

EXAMPLE 5

A solution comprising 9.919 lbs. poly(butadiene/styrene) (80/20) rubber, 60.650 lbs. methyl methacrylate monomer, 27.248 lbs. styrene monomer, 21.974 lbs. xylene, 0.206 lbs. hindered phenol antioxidant, 5.98 gms peroxide initiator, and 0.0094 gms. organo blue dye was continuously polymerized at 175° C., 30 min. residence time, 175 psig. Monomer conversion to polymer rate of 36.3% was observed. During devolatilization, 1.0% stearic acid lubricant was incorporated into the polymer.

Devolatilized material exhibited the following performance:

Izod Notched Impact, 23° C.=6.5 ft-lbs/in. notch. 0° C.=5.2 ft-lbs/in. notch. −40° C.=4.2 ft-lbs/in. notch.
Flexural Modulus of Elasticity, 23° C.=235,320 psi.
DTUL, 264 psi=76° C.
Haze, 23° C.=8.0
Melt Flow Rate (F)=8.8 g/10 min.

EXAMPLE 6

A solution comprising 10.807 lbs. poly(butadiene/styrene) (80/20) rubber, 60.150 lbs. methyl methacrylate monomer, 27.024 lbs. styrene monomer, 21.793 lbs. xylene, 102.3 gms. hindered phenol antioxidant, 5.93 gms peroxide initiator was continuously polymerized at 165° C., 60 min. residence time, 175 psig. Monomer conversion to polymer rate of 37.6% was observed. Devolatilized material exhibited the following performance:

Izod Notched Impact, 23° C.=5.7 ft-lbs/in. notch. 0° C.=3.9 ft-lbs/in. notch. −40° C.=1.9 ft-lbs/in. notch.
Flexural Modulus of Elasticity, 23° C.=250,980 psi.
DTUL, 264 psi=86° C.
Haze, 23° C.=12.4. 30° C.=8.9.
Melt Flow Rate (F)=1.5 g/10 min. (I)=0.5 g/10 min.

EXAMPLE 7

A solution comprising 9.006 lbs. poly(butadiene/styrene) (80/20) rubber, 60.150 lbs. methyl methacrylate monomer, 27.024 lbs. styrene monomer, 21.793 lbs. xylene, 102.3 gms. hindered phenol antioxidant, 5.93 gms peroxide initiator was continuously polymerized at 185° C., 30 min. residence time, 175 psig. Monomer conversion to polymer rate of 43.0% was observed. Devolatilized material exhibited the following performance:

Izod Notched Impact, 23° C.=3.9 ft-lbs/in. notch. 0° C.=2.0 ft-lbs/in. notch. −40° C.=1.2 ft-lbs/in. notch.
Flexural Modulus of Elasticity, 23° C.=252,670 psi.
DTUL, 264 psi=81° C.
Haze, 23° C.=11.4
Melt Flow Rate (F)=9.4 g/10 min. (I)=2.9 g/10 min.

EXAMPLE 8

A solution comprising 16.934 lbs. poly(butadiene/styrene) (80/20) rubber, 69.006 lbs. methyl methacrylate monomer, 33.989 lbs. styrene monomer, 32.1 gms. hindered phenol antioxidant, 4.67 gms peroxide initiator was continuously polymerized at 175° C., 45 min. residence time, 175 psig. Monomer conversion to polymer rate of 50.1% was observed. Devolatilized material exhibited the following performance:

Izod Notched Impact, 23° C.=5.8 ft-lbs/in. notch. 0° C.=4.3 ft-lbs/in. notch. −40° C.=1.7 ft-lbs/in. notch.
Flexural Modulus of Elasticity, 23° C.=242,930 psi.
DTUL, 264 psi=85° C.
Haze, 23° C.=15.5.
Melt Flow Rate (F)=1.4 g/10 min. (I)=0.2 g/10 min.

EXAMPLE 9

A solution comprising 6.722 lbs. poly(butadiene/styrene) (80/20) rubber, 61.598 lbs. methyl methacrylate monomer, 28.989 lbs. styrene monomer, 22.646 lbs. xylene, 0.044 gms. hindered phenol antioxidant, 12.33 gms. n-dodecyl mercaptan, and 6.16 gms peroxide initiator was continuously polymerized at 165° C., 60 min. residence time, 175 psig. Monomer conversion to polymer rate of 38.8% was observed. Devolatilized material exhibited the following performance:

Izod Notched Impact, 23° C.=3.0 ft-lbs/in. notch. 0° C.=1.6 ft-lbs/in. notch. −40° C.=1.1 ft-lbs/in. notch.
Flexural Modulus of Elasticity, 23° C.=321,700 psi.
DTUL, 264 psi=85° C.
Haze, 23° C.=6.2. 30° C.=5.3.
Melt Flow Rate (F)=8.5 g/10 min. (I)=4.1 g/10 min.

EXAMPLE 10

A solution comprising 9.913 lbs. poly(butadiene/styrene) (80/20) rubber, 75.914 lbs. methyl methacrylate monomer, 34.106 lbs. styrene monomer, 0.066 gms. hindered phenol antioxidant and 7.49 gms peroxide initiator was continuously polymerized at 180° C., 30 min. residence time, 175 psig. Monomer conversion to polymer rate of 49.8% was observed. Devolatilized material exhibited the following performance:

Izod Notched Impact, 23° C.=3.1 ft-lbs/in. notch. 0° C.=1.6 ft-lbs/in. notch. −40° C.=1.0 ft-lbs/in. notch.
Flexural Modulus of Elasticity, 23° C.=317,430 psi.
DTUL, 264 psi=82° C.
Haze, 23° C.=11.6. 38° C.=6.0.
Melt Flow Rate (F)=4.2 g/10 min. (I)=2.6 g/10 min.

EXAMPLE 11

A solution comprising 10.630 lbs. poly(butadiene/styrene) (80/20) rubber, 73.280 lbs. methyl methacrylate monomer, 36.100 lbs. styrene monomer, 32.1 gms. hindered phenol antioxidant and 1.98 gms peroxide initiator was continuously polymerized at 195° C., 40 min. residence time, 150 psig. Monomer conversion to polymer rate of 58.0% was observed. Devolatilized material exhibited the following performance:

Izod Notched Impact, 23° C.=0.69 ft-lbs/in. notch. −40° C.=0.25 ft-lbs/in. notch.
Flexural Modulus of Elasticity, 23° C.=311,000 psi.
DTUL, 264 psi=80° C.
Haze, 23° C.=28.0.
Melt Flow Rate (F)=40.4 g/10 min. (I)=21.6 g/10 min.

EXAMPLE 12

A solution comprising 8.876 lbs. poly(butadiene/styrene) (80/20) rubber, 58.806 lbs. methyl methacrylate monomer, 27.539 lbs. styrene monomer, 3.389 lbs ethyl acrylate monomer, 21.184 lbs. xylene, 0.206 gms. hindered phenol antioxidant, 38.44 gms. n-dodecyl mercaptan, and 0.009 gms organo blue dye, and 5.77 gms peroxide initiator was continuously polymerized at 175° C., 30 min. residence time, 175 psig. Monomer conversion to polymer rate of 38.2% was observed. Devolatilized material exhibited the following performance:
Izod Notched Impact, 23° C.=2.5 ft-lbs/in. notch. 0° C.=1.2 ft-lbs/in. notch. −40° C.=0.9 ft-lbs/in. notch.
Flexural Modulus of Elasticity, 23° C.=257,600 psi.
DTUL, 264 psi=78° C.
Haze, 23° C.=8.0.
Melt Flow Rate (F)=69 g/10 min.

EXAMPLE 13

A solution comprising 4.047 lbs. poly(butadiene/styrene) (80/20)rubber, 69.415 lbs. methyl methacrylate monomer, 31.187 lbs. styrene monomer, 25.150 lbs. xylene, 0.203 gms. hindered phenol antioxidant, 0.0092 gms organo blue dye, and 6.85 gms peroxide initiator was continuously polymerized at 175° C., 30 min. residence time, 175 psig. Monomer conversion to polymer rate of 36.1% was observed. During devolatilization, 1.0% stearic acid lubricant was incorporated into the polymer. Devolatilized material exhibited the following performance:
Izod Notched Impact, 23° C.=1.6 ft-lbs/in. notch. 0° C.=0.9 ft-lbs/in. notch. −40° C.=0.4 ft-lbs/in. notch.
Flexural Modulus of Elasticity, 23° C.=398,640 psi.
DTUL, 264 psi=82° C.
Haze, 23° C.=5.2.
Melt Flow Rate (F)=31.0 g/10 min.

EXAMPLE 14

A solution comprising 7.055 lbs. poly (butadiene/styrene) (80/20 ) rubber, 63.032 lbs. methyl methacrylate monomer, 3.927 lbs ethyl acrylate monomer, 31.221 lbs. styrene monomer, 24.545 lbs. xylene, 0.221 gms. hindered phenol antioxidant, 44.53 gms. n-dodecyl mercaptan, and 0.010 gms organo blue dye, and 6.68 gms peroxide initiator was continuously polymerized at 175° C., 30 min. residence time 175 psig. Monomer conversion to polymer rate of 37.5% was observed. During devolatilization, 1.0% stearic acid lubricant was incorporated into the polymer. Devolatilized material exhibited the following performance:
Izod Notched Impact, 23° C.=1.2 ft-lbs/in. notch. 0° C.=1.0 ft-lbs/in. notch. −40° C.=0.7 ft-lbs/in. notch.
Flexural Modulus of Elasticity, 23° C.=308,120 psi.
DTUL, 264 psi=76° C.
Haze, 23° C.=5.5.
Melt Flow Rate (F)=96 g/10 min.

EXAMPLE 15

A solution comprising 3.592 pounds poly(butadiene/styrene) (80/20 ) rubber, 87.280 lbs. methyl methacrylate monomer, 29.093 lbs. toluene, 0.036 lbs. antioxidant stabilizer, and 5.94 gms. peroxide initiator was continuously polymerized at 180° C., 30 minute residence time, 175 psig. Monomer conversion to 37% is observed.

EXAMPLE 16 (Comparative)

This example shows the properties of material made in absence of synthetic rubber.
A solution comprising 63.480 lbs. methyl methacrylate monomer, 28.520 lbs. styrene monomer, 23.000 lbs. xylene, and 6.26 gms peroxide initiator was continuously polymerized at 175° C., 30 min. residence time, 175 psig. Monomer conversion to polymer rate of 41.2% was observed. Devolatilized material exhibited the following performance:

Izod Notched Impact, 23° C.=0.23 ft-lbs/in. notch. 0° C.=0.19 ft-lbs/in. notch. −40° C.=0.12 ft-lbs/in. notch.
Flexural Modulus of Elasticity, 23° C.=478,710 psi.
DTUL, 264 psi=89° C.
Haze, 23° C.=2.2.
Melt Flow Rate (F)=30.6 g/10 min.

EXAMPLE 17 (Comparative)

This example shows incorporation of synthetic rubber after the polymerization step. The methyl methacrylate/styrene/acrylonitrile (75/20/5) polymer was prepared in accordance with Example 1, except in the absence of predissolved rubber. After polymerization, 80 parts of the MMA/St/AN polymer were blended with 20 parts of polybutadiene rubber, and blended in a devolatilizing extruder, 0.8" twin screw, at 200°–250° C. Sample A had no peroxide initiator, and sample B did have added peroxide initiator.
The materials exhibited the following performance:

|  | Sample A | Sample B |
|---|---|---|
| Izod Notched Impact, 23° C. (ft lbs/in notch) | 0.32 | 0.34 |

EXAMPLE 18 (Comparative)

Example 17 was repeated, except using methyl methacrylate homopolymer instead of the MMA/St/ANinterpolymer. The materials exhibited the following performance:

|  | Sample A | Sample B |
|---|---|---|
| Izod Notched Impact, 23° C. (ft lbs/in notch) | 0.30 | 0.32 |

Examples 17 and 18 demonstrate the advantages of predissolving the synthetic polymer versus introducing the rubber versus adding the rubber "after the polymerizing step.".

I claim:
1. A single stage process comprising continuously introducing a solution of synthetic rubber in a monomer system comprising methyl methacrylate into a single reactor in the presence of a free radial initiator, continuously stirring said solution to create a trubulent flow, controlling the temperature at about 161 to 195° C., controlling the average residence time to below 90 minutes, and continuously removing the resultant graft polymer having a dispersed rubber phase and a continuous hard phase from said reactor.
2. Process of claim 1 wherein the synthetic rubber is selected from the group consisting of polybutadiene butadiene-styrene copolymer, ethylene-propylene diene copolymer, and isoprene copolymer and copolymers.
3. Process of claim 1 wherein said stirring is at a rate of about 1000 to 2000 rpm and creates a turbulent mass flow.
4. Process of claim 1 wherein said stirring creates a turbulent mass flow with a Reynold's value above 2100.
5. Process of claim 1 wherein said temperature is about 165° to 180° C.
6. Process of claim 1 wherein said solution also comprises a non-reactive solvent.
7. Process of claim 6 wherein said solvent comprises up to 25% by weight of the solution, and is selected from the group consisting of xylene, toluene, and benzene.

8. Process of claim 6 wherein the continuously removed product is polymerized to about 40 to 90% monomer conversion.

9. Process of claim 1 wherein said monomer system further includes up to 40%, based on weight of monomer system, of one or more other monomers selected from the group consisting of styrene, acrylonitrile, alpha-methyl styrene, methyl acrylate, ethyl acrylate, and butyl acrylate.

10. Process of claim 1 wherein the monomer system consists of about 1 to 40% styrene and the balance methyl methacrylate.

11. Process of claim 1 wherein the synthetic rubber is polybutadiene or butadiene-styrene copolymer containing up to 50% styrene units.

12. Process of claim 1 wherein the polymerization is conducted in the absence of a non-reactive solvent, where styrene is present, and the continuously removed product is polymerized to about 30 to 60% monomer conversion.

13. Rigid, high impact strength, low melt viscosity graft polymer composition prepared by the process of claim 1, 2, 3, 4, 5, 6, 7, 8, 9, 10, 11, or 12.

14. Process of claim 1 wherein the pressure is controlled to about 100 to 175 psig.

15. Process of claim 1 wherein said process is conducted in the presence of an organic peroxide or azo initiator.

* * * * *